No. 777,303. PATENTED DEC. 13, 1904.
T. POLING.
FASTENING FOR PICK HANDLES, &c.
APPLICATION FILED JUNE 27, 1904.
NO MODEL.
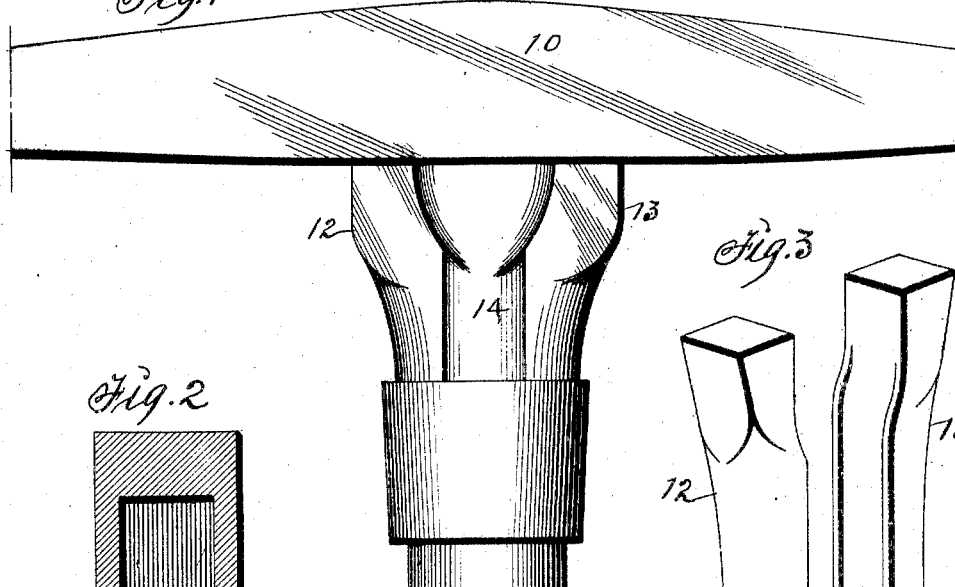
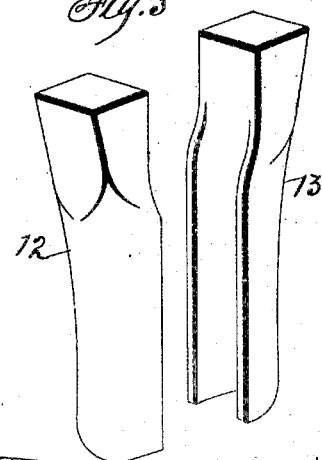
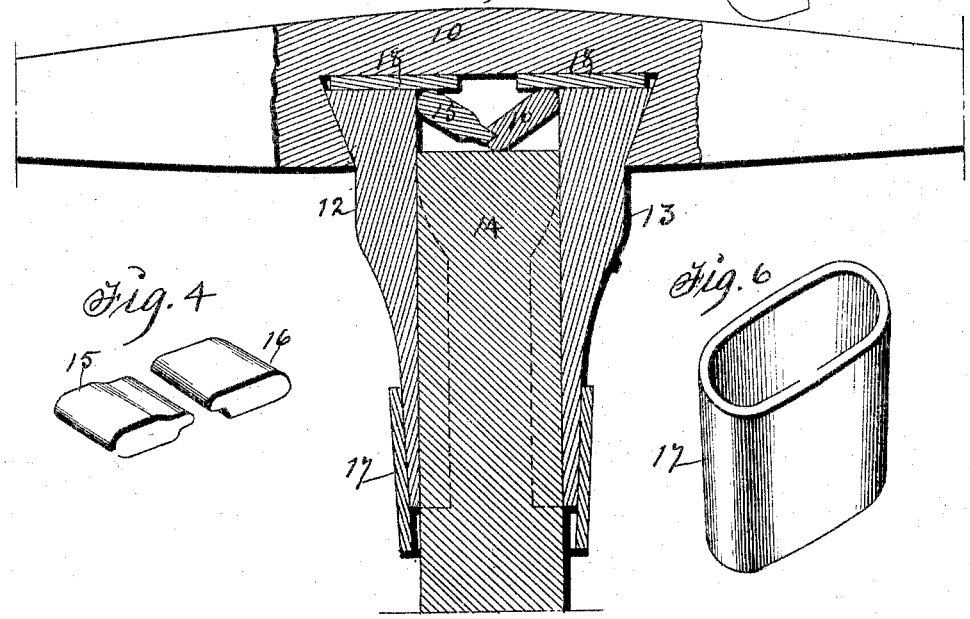
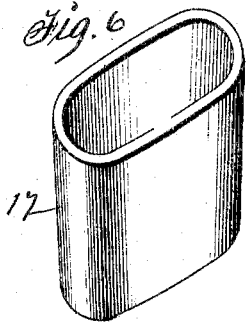
Witnesses:
R. C. Orwig.
L. L. Leibrock.
Inventor: Totten Poling,
By Thomas G. Orwig, Attorney.

No. 777,303.

Patented December 13, 1904.

UNITED STATES PATENT OFFICE.

TOTTEN POLING, OF MENLO, IOWA.

FASTENING FOR PICK-HANDLES, &c.

SPECIFICATION forming part of Letters Patent No. 777,303, dated December 13, 1904.

Application filed June 27, 1904. Serial No. 214,430. (No model.)

*To all whom it may concern:*

Be it known that I, TOTTEN POLING, a citizen of the United States, residing at Menlo, in the county of Guthrie and State of Iowa, have invented a new and useful Fastening for Pick-Handles, &c., of which the following is a specification.

My object is to detachably fasten a wooden handle in a metal pick and other tools by pressing the handle on toggles to force dovetail ends of metal keepers into the ends of a cavity in the pick as required to utilize the force of a toggle-joint lever in wedging the end of the handle fast between the keepers when locked to the pick.

My invention consists in the construction, arrangement, and combination of parts, as hereinafter set forth, pointed out in my claims, and illustrated in the accompanying drawings, in which—

Figure 1 is a side view of the pick and the handle detachably fixed thereto as required for practical use. Fig. 2 is a transverse sectional view that shows the cavity in the front face of the pick. Fig. 3 is a perspective view of the mating keepers adapted to be fixed in the cavity in the pick and to be clamped to a wooden handle. Fig. 4 is a perspective view of articulated toggles adapted to be inclosed in the cavity in the pick for fastening the keepers in the cavity in the pick and clamping them to the wooden handle. Fig. 5 is a sectional view of the pick and the keepers fastened in the cavity and to the wooden handle by means of the toggles in the cavity and a sleeve on the handle. Fig. 6 is a perspective view of the sleeve.

The numeral 10 designates a pick. It has a dovetail cavity in its front face, as shown in Fig. 3. Keepers 12 and 13 are in the ends of the dovetail cavity, and their outer end portions are concavo-convex and adapted to overlie and clamp fast to the parallel sides of the wooden handle 14. The articulated toggles 15 and 16 are placed in the cavity in such a manner that when the end of the handle 14 is pressed upon the toggles they will force the ends of the keepers in the cavity into position, as shown in Fig. 5 and as required to fasten them in the dovetail ends of the cavity. At the same time that the keepers are thus fastened in the cavity and to the pick the parts of the keepers that extend out from the cavity are clamped to the wooden handle and will be retained in such position by a metal sleeve 17, slipped over the handle and the ends of the keepers 13 and 14, as shown in Fig. 1. To detach the handle from the pick, it is only necessary to slip the sleeve from the keepers and then withdraw the handle from them and out of the cavity in the pick. It is obvious hammers and axes may be provided with cavities in a like manner for detachably fastening wooden handles thereto. Flat plates 18 may be placed in the cavity on the pick, as shown in Fig. 5, when necessary to fill space and to compensate for wear of the toggles.

Having thus set forth the purpose of my invention and the construction and combination of all the parts, the practical operation and utility thereof will be readily understood by persons familiar with the art to which it pertains; and

What I claim as new, and desire to secure by Letters Patent, is—

1. In a handle-fastening for picks, a pick having a dovetail cavity in its front edge or face, mating keepers fitted in the cavity and also fitted to receive a wooden handle, toggles placed in the cavity and in contact with the keepers, a wooden handle between the keepers and in contact with the toggles, and means for retaining the keepers in contact with the handle, as and for the purposes stated.

2. In a handle-fastening for picks, a pick having a dovetail cavity in its front edge or face, mating keepers fitted in the cavity and also fitted to receive a wooden handle, toggles placed in the cavity and in contact with the keepers, a wooden handle between the keepers and in contact with the toggles and a sleeve for retaining the keepers in contact with the handle, as and for the purposes stated.

TOTTEN POLING.

Witnesses:
F. C. POLING,
L. MANWELL.